United States Patent [19]
Troutner

[11] Patent Number: 4,615,154
[45] Date of Patent: Oct. 7, 1986

[54] UTILITY LINE TRANSMISSION TOWER APPARATUS

[75] Inventor: Arthur L. Troutner, Boise, Id.

[73] Assignee: Trus Joist Corporation, Boise, Id.

[21] Appl. No.: 750,098

[22] Filed: Jun. 28, 1985

[51] Int. Cl.⁴ .................................... E04H 12/00
[52] U.S. Cl. .................... 52/40; 248/219.2; 174/45 R; 403/264; 52/697
[58] Field of Search ............ 52/40, 642, 649, 697, 52/731, 811; 248/219.2; 174/45 R, 43, 149; 211/107; 403/255, 245, 264

[56] References Cited

U.S. PATENT DOCUMENTS

| | | | |
|---|---|---|---|
| 2,230,628 | 2/1941 | Sahlberg | 52/731 |
| 3,160,434 | 12/1964 | Hedgepath | 52/122.1 |
| 3,299,586 | 1/1967 | Hockaday | 52/40 |
| 3,571,991 | 3/1971 | Doocy | 52/649 |
| 3,603,717 | 9/1971 | Scott | 52/40 |
| 3,649,740 | 3/1972 | Boyer | 174/45 R |
| 4,194,080 | 3/1980 | Meisberger | 52/40 |

OTHER PUBLICATIONS

Miller; Copters Eliminate Pioneer Roads, Leave Landscape Undisturbed; Sep. 30 1968; pp. 66-67.

Primary Examiner—William F. Pate, III
Assistant Examiner—Dan W. Pedersen
Attorney, Agent, or Firm—Klarquist, Sparkman, Campbell, Leigh & Whinston

[57] ABSTRACT

A lightweight electrical utility line transmission tower is disclosed, which is designed to be easily transported by helicopter or truck. The tower uses a single, hollow support column which is positioned in a foundation hole. The column is directly embedded in the ground, and requires no special auxiliary concrete foundation. Two tapered tower arms are secured to the column in a V-shaped configuration by an improved connection and reinforcing apparatus. Attached to the tower arms is an elongate crossarm to which transmission lines are secured.

20 Claims, 9 Drawing Figures

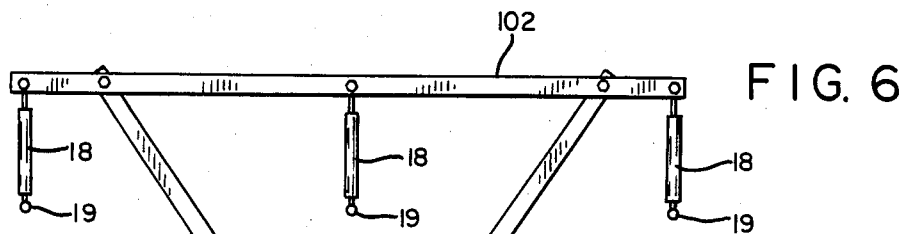
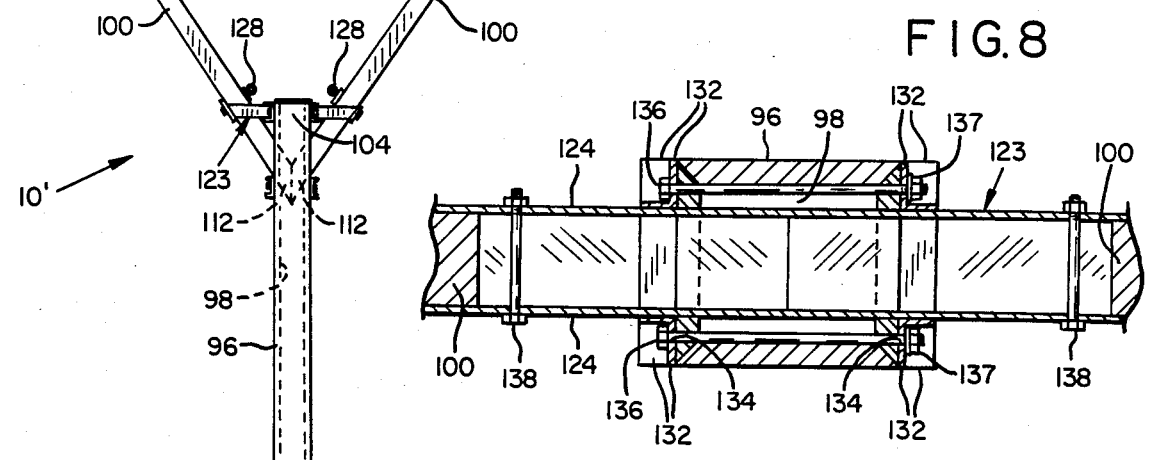
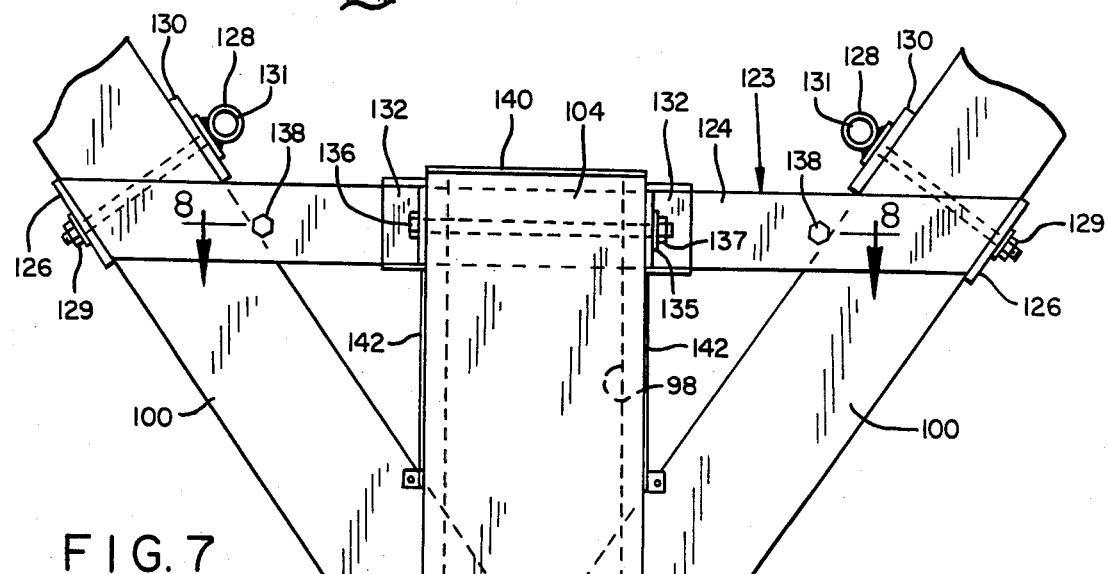
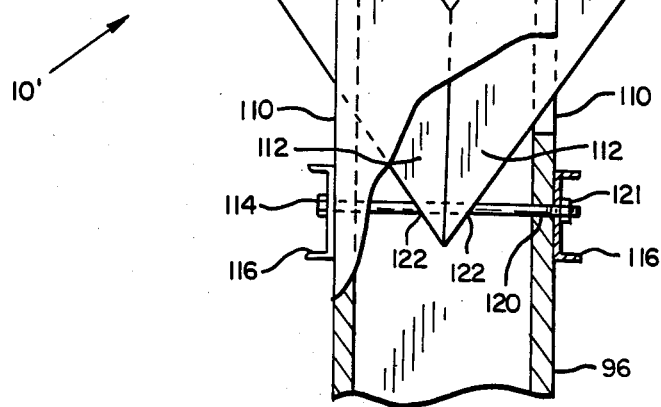

UTILITY LINE TRANSMISSION TOWER APPARATUS

BACKGROUND OF THE INVENTION

The present invention generally relates to electrical utility line support towers, and more particularly to electrical utility line support towers having a hollow support column and two tower arms attached to the support column by an improved connection means. The tower arms are arranged in a V-shaped configuration and support a crossarm arrangement to which utility lines are attached.

The erection of electrical utility line towers is a costly process, requiring a substantial amount of time and labor. For example, erecting wood, steel, or concrete towers of solid construction requires large and heavy equipment. Furthermore, the transportation of such towers is slow and difficult.

Towers using a multi-pole structure present other problems. Such towers require the excavation of multiple foundation holes. This is especially difficult if the holes must be placed in rock. Also, the erection of multi-pole structures requires increased amounts of land. When a multi-pole tower is positioned on expensive farmland, the need to excavate multiple foundation holes results in substantially increased costs.

A need therefore exists for a utility line transmission tower which is easily transported, easily erected, requires minimal amounts of foundation land, and overcomes the other problems described above.

SUMMARY OF THE INVENTION

In accordance with the present invention, a lightweight utility line transmission tower is provided. The tower is designed to be easily transported by helicopter or truck. Specifically, the tower uses a single, hollow support column which is positioned in a foundation hole. The column is directly embedded in the ground, and requires no special auxiliary foundation. Attached to the column are two tapered tower arms. The tower arms are secured to the column in a V-shaped configuration by a connection means at the top of the column. Attached to the tower arms is an elongate crossarm assembly to which transmission lines are secured.

It is therefore one object of the present invention to provide a utility line transmission tower of simple, lightweight, and economical construction.

Another object of the present invention is to provide a utility line transmission tower which is easily transportable to an erection site.

A further object of the present invention is to provide a utility line transmission tower requiring minimal field assembly time.

An additional object of the present invention is to provide a utility line transmission tower requiring minimal amounts of foundation land.

Still another object of the present invention is to provide a utility line transmission tower having tower arms supported in a V-shaped configuration whereby the crossarm of the tower has a reduced cantilever length and cross sectional area.

A still further object of the present invention is to provide a utility line transmission tower having a structural geometry resulting in a tower structure of lower height and reduced wind resistance.

DESCRIPTION OF THE DRAWINGS

Other objects and advantages of the present invention will be apparent from the following detailed description of preferred embodiments thereof and from the attached drawings of which:

FIG. 6 is a front elevation view of another embodiment of the present invention;

FIG. 7 is an enlarged front elevation view of a portion of the embodiment of FIG. 6 specifically showing the connection means for attaching the tower arms to the box column;

FIG. 8 is a horizontal section view of the embodiment of FIG. 6 taken along lines 8—8 of FIG. 7.

DETAILED DESCRIPTION OF PREFERRED EMBODIMENTS

Figure 1:
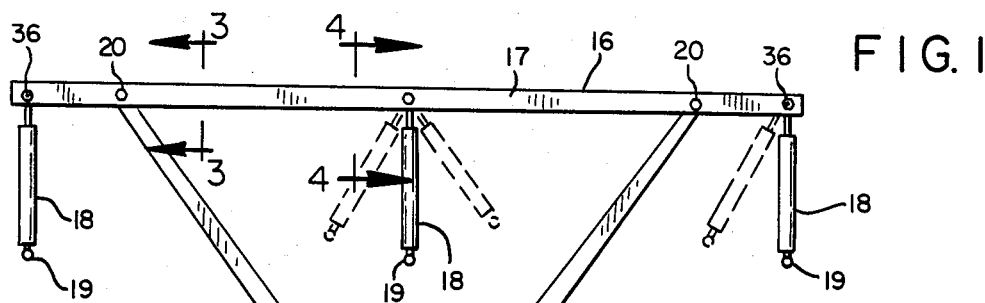
FIG. 1 is a front elevation view of one embodiment of the present invention.

Shown in FIG. 1 is a utility line transmission tower 10 in accordance with one embodiment of the present invention. The tower 10 consists of a base member in the form of a hollow box column 12 having an open top, two tapered tower arms 14, and a crossarm assembly 16. The box column 12 has a hollow interior 13 and is preferably constructed of laminated veneer lumber. It is directly embedded in the ground and requires no special auxiliary foundation. The tower arms 14 are preferably manufactured of laminated veneer lumber. They may be of solid construction or of a structural box design. Suspended from the crossarm assembly 16 are insulators 18 for utility lines 19.

Figure 3:
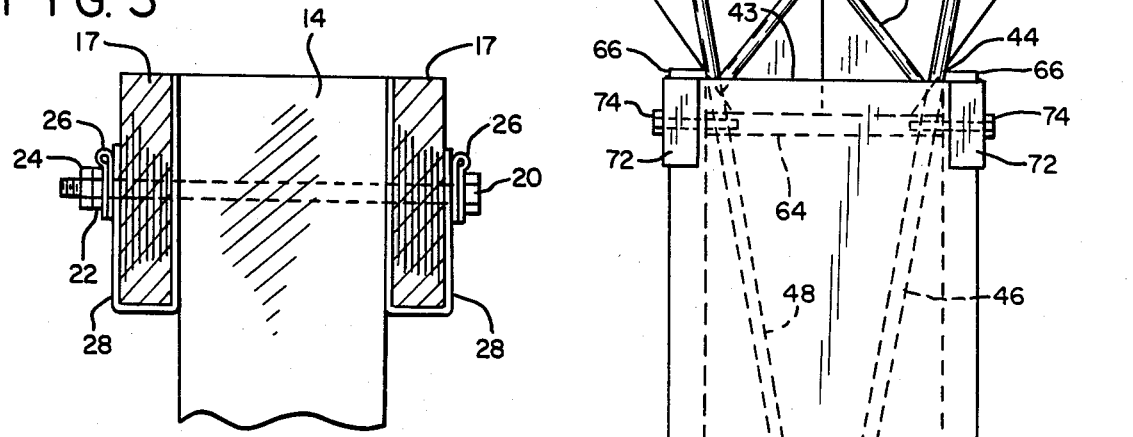
FIG. 3 is a vertical section view of the embodiment of FIG. 1 taken along lines 3—3 of FIG. 1.
Figure 4:
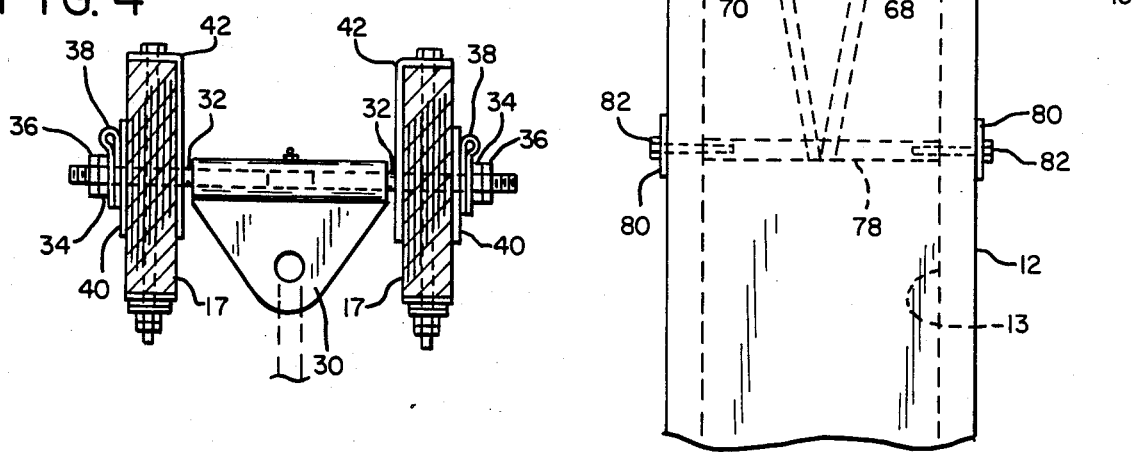
FIG. 4 is a vertical section view of the embodiment of FIG. 1 taken along lines 4—4 of FIG. 1.

FIGS. 3 and 4 show sectional views of the crossarm assembly 16. The crossarm assembly 16 has two elongate crossarm members 17. In FIG. 3, the attachment between the crossarm members 17 and a tower arm 14 is shown. The upper end of each tower arm 14 is attached to crossarm members 17 using bolt 20, nut 22, locknut 24, and spring lock washers 26. To provide structural reinforcement, U-shaped reinforcing members 28 are secured to the crossarm members 17.

FIG. 4 shows the crossarm members 17 and a power line hanger 30 positioned therebetween which supports the insulator 18 and power line 19. The power line hanger 30 is freely rotatable on threaded studs 32 to adjust the spacing between the crossarm members 17. The threaded studs 32 are fixedly secured by welding to L-shaped support members 42 which are bolted to the tops of the crossarm members 17. The studs 32 are secured to the crossarm members 17 using nuts 34, locknuts 36, spring lock washers 38, and square washers 40.

Figure 2:
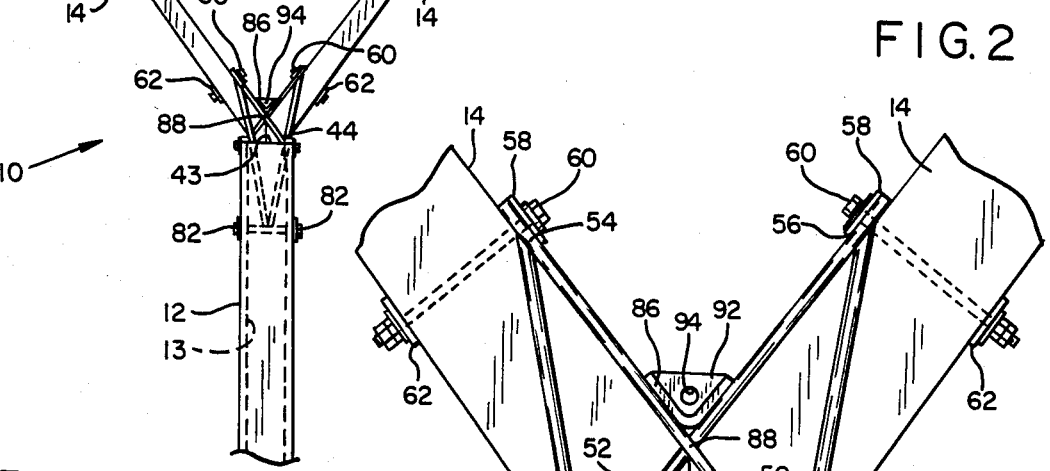
FIG. 2 is an enlarged front elevation view of a portion of the embodiment of FIG. 1 specifically showing the connection means for attaching the tower arms to the box column.
Figure 5:
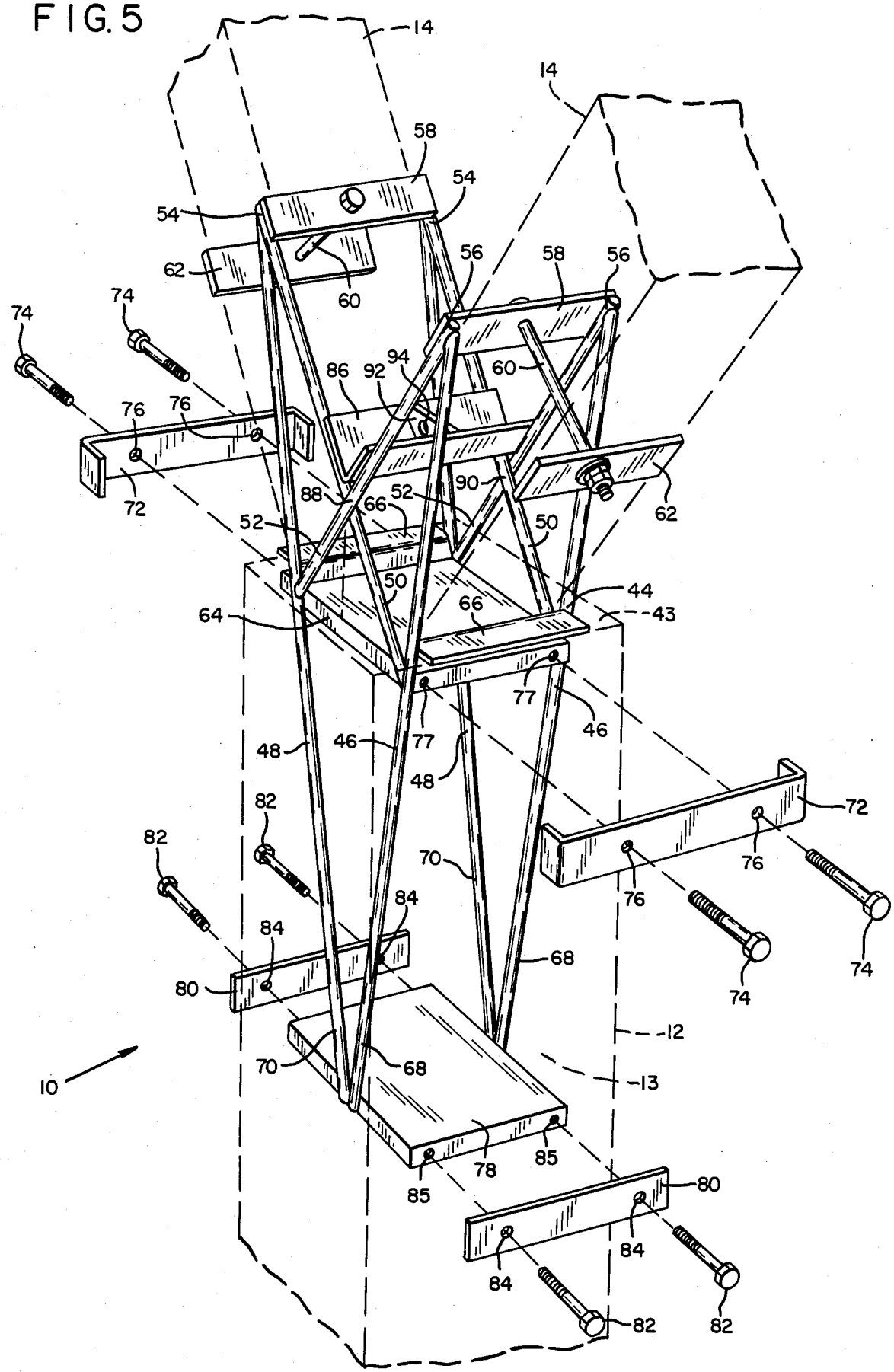
FIG. 5 is an enlarged exploded perspective view of a portion of the embodiment of FIG. 1 showing the connection means for attaching the tower arms to the box column.

The tower arms 14 are connected in a V-shaped configuration at the top 43 of the box column 12 using a connection means including a metal frame structure 44, shown specifically in FIGS. 2 and 5. The frame structure 44 consists of two pairs of main support rods 46, 48 and two pairs of cross support rods 50, 52.

Affixed by welding to the upper ends 54, 56 of cross support rods 50, 52 are fastening plates 58. Connected to plates 58 by bolts 60 are second fastening plates 62. Fastening plates 58, 62 secure tower arms 14 in a V-shaped angular relationship with respect to each other, as shown in FIGS. 2 and 5.

Affixed at an intermediate position with respect to support rods 46, 48 is a horizontal anchor plate 64. The horizontal anchor plate 64 is positioned directly below the top 43 of the box column 12. Fixedly positioned above the horizontal anchor plate 64 are two stop flange members 66. With reference to FIG. 5, the stop flange members 66 rest on the top 43 of the box column 12. The stop flange members 66 facilitate the proper position of the frame structure 44 within the column 12, as shown.

The lower portions of the frame structure 44, including ends 68, 70 of main support rods 46, 48 are positioned within the hollow interior 13 of the box column 12. To secure the frame structure 44 in this position, mounting brackets 72 are provided. Mounting brackets 72, positioned on the exterior of the box column 12, are secured thereto and to anchor plate 64 using bolts 74. As shown in FIG. 5, bolts 74 extend through openings 76 in the mounting brackets 72, through the walls of the box column 12 and through threaded openings 77 in the anchor plate 64.

To secure the lower ends 68, 70 of main support rods 46, 48 inside the box column 12, a horizontal anchor plate 78 is attached thereto by welding. Mounting brackets 80 are provided outside the column 12 to secure the horizontal anchor plate 78 in position within the box column. Mounting brackets 80 are secured to the exterior of the box column 12 using bolts 82. The bolts 82 extend through openings 84 in the mounting brackets 80, through the walls of the box column 12, and into threaded openings 85 in the anchor plate 78.

The connection means including frame structure 44, as described above, secures the tower arms 14 to the box column 12 in a V-shaped configuration. This relationship provides for increased strength, stability, and structural integrity.

To transport and erect the utility line transmission tower 10, a V-bracket 86 is secured by welding adjacent to and above the intersection points 88, 90 of the cross support rods 50, 52. Attached to the V-bracket 86 is a triangular lifting member 92 having an opening 94 therein. A helicopter or crane can lift the entire utility line transmission tower 10 by placing a cable hook or the like through the opening 94 of the lifting member 92. The transmission tower 10 can then be moved and/or erected in a fast and efficient manner.

A second embodiment of the transmission line tower 10' of the present invention is shown in FIGS. 6-9. With reference to FIG. 6, a box column 96 having a hollow interior 98 is provided. Two tower arms 100 and a crossarm assembly 102, substantially similar to those shown in the previous embodiment, are attached at the upper portion 104 of the box column 96. However, the embodiment of FIGS. 6-9 uses different connection means for attaching the tower arms 100 to the box column 96.

Figure 9:
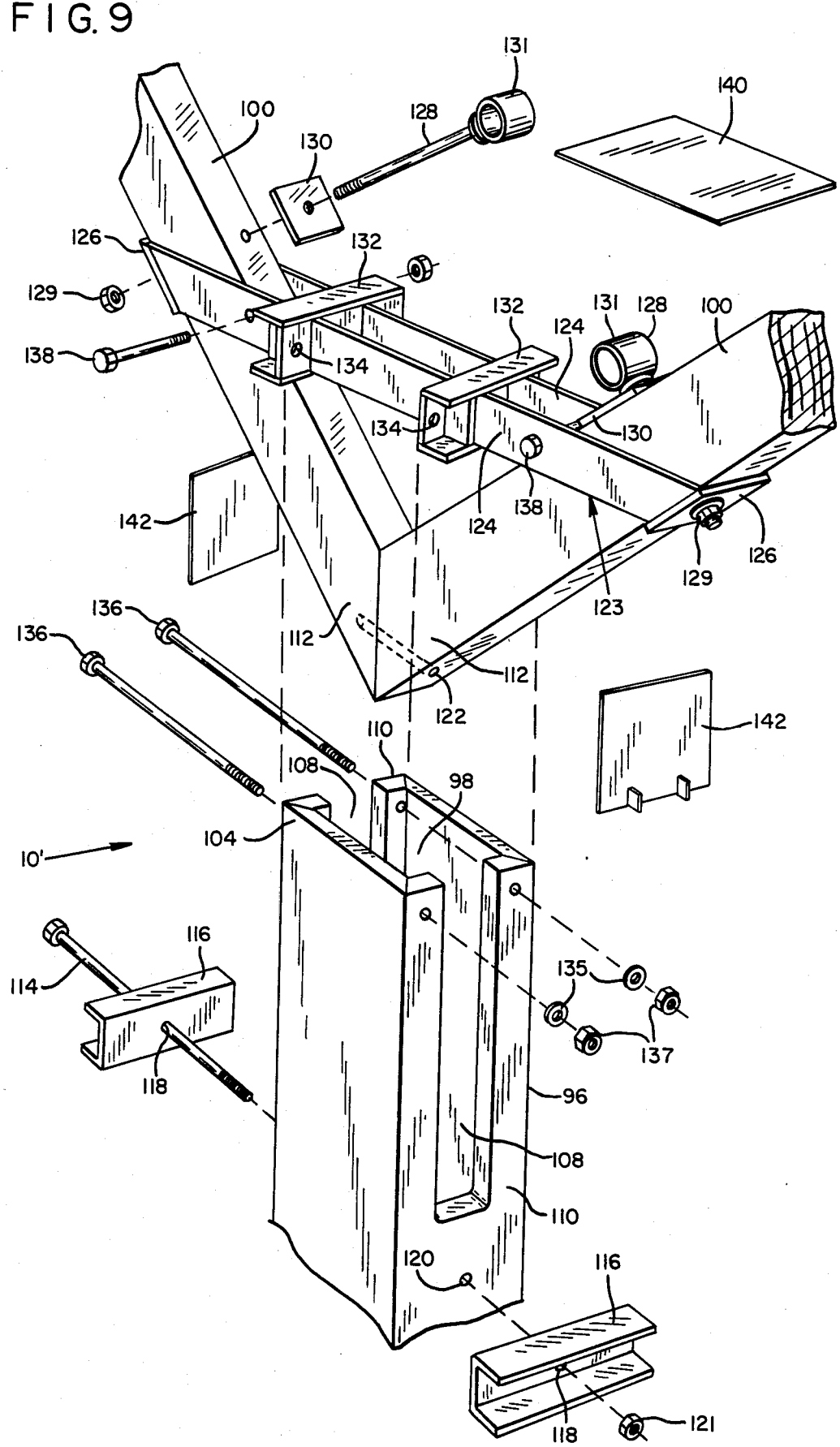
FIG. 9 is an enlarged exploded perspective view of a portion of the embodiment of FIG. 6 showing the connection means for attaching the tower arms to the box column.

With particular reference to FIG. 9, an elongate side opening 108 is provided in the top portion 104 on each side 110 of the box column 96. The elongate side openings 108 are of a width sized to receive the tower arms 100. The lower end portions 112 of the tower arms 100 are secured within the interior 98 of the box column 96 using a bolt 114 passed through a hole 122 in such lower end portions. Two channel shaped brackets 116 are provided on the sides 110 of the box column 96. Bolt 114 is passed through openings 118 in the brackets 116, through openings 120 in the side walls 110, through hole 122, and threaded into a nut 121.

The tower arms 100 are maintained in a V-shaped configuration using a horizontal retaining structure 123, shown in detail in FIGS. 7-9. The horizontal retaining structure 123 is spaced upwardly from the lower end portions 112 of the tower arms 100 and secured thereto. The horizontal retaining structure 123 consists of two side members 124 on opposite sides of the arms 100, attached at each end to tie plates 126. The tie plates 126 are secured to the tower arms 100 using two shouldered eye bolts 128. The shouldered eye bolts 128 are first passed through a square washer 130, through tower arms 100, and then through holes in tie plates 126 where they are threaded into nuts 129. The shouldered eye bolts 128 have ring shaped heads 131 which function as lift rings for facilitating the movement and erection of the utility line transmission tower 10'.

To secure the horizontal retaining structure 123 and attached tower arms 100 to the box column 96, two spaced mounting brackets 132 positioned on the side members 124 are used. As shown in FIG. 9, the mounting brackets 132 each have two openings 134 through which two bolts 136 can pass. After the tower arms 100 are lowered into the hollow interior 98 of the box column 96 through elongate side openings 108, the mounting brackets 132 are secured to sides 110 using the bolts 136, washers 135, and lock nuts 137. In addition, bolts 138 are inserted through the side members 124 to provide additional support for the horizontal retaining structure 123.

Finally, top cover panel 140 and two side cover panels 142, shown in FIGS. 7 and 9, are secured to the box column 96 by conventional means to close the side openings 108 and the top opening of the column to prevent the entry of water and insects.

The present invention provides a strong, lightweight utility line transmission tower which is easily transported by air or truck. As described above, the invention incorporates a lift ring arrangement to allow a crane or helicopter to position the tower in a pre-excavated foundation hole.

Typically, the tower is field assembled in less than one hour. Only one foundation hole is required. The use of a single foundation hole greatly reduces the amount of time required to install the tower. Furthermore, a single foundation hole minimizes the amount of ground right-of-way required. This is of particular importance when the tower is erected on high cost farmland.

The geometry of design incorporated in the present invention permits the use of a crossarm structure having minimal cross sectional area and cantilever length. This geometry of design also allows the location of shield wires, when required, to be in close proximity with the crossarm. As a result, the overall height of the tower is lower, thereby offering less wind resistance. Finally, the geometry of the present invention allows the proper electrical clearance for peregrines, providing them with safe nesting spots. This is an important consideration if the tower is positioned on federal land.

It will be obvious to those having ordinary skill in the art that many changes may be made in the invention as described above. Therefore, the scope of the invention should be determined by the following claims.

I claim:

1. Electrical utility line support tower, comprising:
   a tower base member having at least one opening at its upper end;
   a pair of tower arms;
   connection means for connecting one end of each of said arms to the upper end of said base member, said connection means including an anchor portion having diverging anchor members mounted within said base member, extending upward through said opening and attached to the tower arms, and a pair of arm support portions which attach the tower arms to the base member at a position spaced from the anchor portion;
   fastening means for fastening the pair of tower arms to said pair of arm support portions of said connection means so that said arms diverge from each other and extend outwardly from said base member; and
   crossarm means for supporting electrical utility lines, said crossarm means being mounted between the pair of tower arms.

2. A tower in accordance with claim 1 in which the base member is a hollow box column.

3. A tower in accordance with claim 2 in which the column is made of laminated veneer lumber.

4. A tower in accordance with claim 3 in which the tower arms are tapered beams made of laminated veneer lumber.

5. A tower in accordance with claim 1 in which the connection means includes a V-shaped anchor portion mounted within the hollow base member and extending out of said opening.

6. A tower in accordance with claim 5 in which the anchor portion includes two pairs of diverging anchor members which extend upward through an opening adjacent the top of the base member.

7. A tower in accordance with claim 6 in which the anchor portion has a pair of stop flanges which extend outwardly from the diverging anchor members and engage the edges of said diverging top opening to limit the depth that said anchor portion extends into said base member.

8. A tower in accordance with claim 6 in which the pair of arm support portions each extend from the end of one anchor member to the mid-point of the other anchor member of said anchor portion.

9. A tower in accordance with claim 8 in which the fastening means includes a first pair of fastening plates fixedly attached to the ends of the pair of arm support portions and a second pair of fastening plates connected to different ones of said first pair of plates by bolts to clamp the tower arms between the first and second fastening plates.

10. A tower in accordance with claim 1 further comprising means secured to said connection means for the insertion of a lifting member to facilitate the lifting and moving of said tower.

11. Electrical utility line support tower, comprising:
    a tower base member having a hollow upper end, said upper end further comprising two elongate side openings therein;
    a pair of tower arms having their lower ends extending through the side openings into said base member and joined to form a V-shaped configuration;
    connection means for connecting said tower arms to the upper end of said base member, said connection means including a horizontal retaining structure secured to said tower arms and spaced upwardly from the lower ends thereof;
    fastening means for fastening said pair of tower arms to said horizontal retaining structure so that said arms diverge from each other and extend outwardly from said base member; and
    crossarm means for supporting electrical utility lines, said crossarm means being mounted between the pair of tower arms.

12. A tower in accordance with claim 11 in which said base member is a hollow box column.

13. A tower in accordance with claim 12 in which said column is made of laminated veneer lumber.

14. A tower in accordance with claim 13 in which said tower arms are tapered beams made of laminated veneer lumber.

15. A tower in accordance with claim 11 in which said horizontal retaining structure comprises a pair of elongate side members, said tower arms being secured between said side members.

16. A tower in accordance with claim 15 in which said fastening means comprises a pair of tie plates each secured to the ends of said elongate members and to said tower arms.

17. A tower in accordance with claim 16 in which said horizontal retaining structure further comprises a pair of mounting brackets for maintaining said horizontal retaining structure and attached tower arms within said side openings of said base member.

18. A tower in accordance with claim 11 further comprising means for covering said elongate side openings of said base member.

19. A tower in accordance with claim 11 further comprising means adjacent said horizontal retaining structure for the insertion of a lifting member to facilitate the lifting and moving of said tower.

20. Electrical utility line support tower, comprising:
    a tower base member having at least one opening at its upper end;
    a pair of tower arms;
    connection means for connecting one end of each of said arms to the upper end of said base member, said connection means including a V-shaped anchor portion which is mounted within said base member extends out of said opening and is attached to the tower arms, and a pair of arm support portions which attach the tower arms to the base member at a position spaced from the anchor portion;
    fastening means for fastening the pair of tower arms to said pair of arm support portions of said connection means so that said arms diverge from each other and extend outwardly from said base member; and
    crossarm means for supporting electrical utility lines, said crossarm means being mounted between the pair of tower arms.

* * * * *